United States Patent
Tindell et al.

(10) Patent No.: US 6,179,251 B1
(45) Date of Patent: Jan. 30, 2001

(54) THIN INLET LIP DESIGN FOR LOW DRAG AND REDUCED NACELLE SIZE

(75) Inventors: Runyon H. Tindell, Old Bethpage; Warren Davis, East Islip; James J. Karanik, Farmingville, all of NY (US)

(73) Assignee: Northrop Grumman Corporation, Los Angeles, CA (US)

( * ) Notice: Under 35 U.S.C. 154(b), the term of this patent shall be extended for 0 days.

(21) Appl. No.: 09/020,081

(22) Filed: Feb. 6, 1998

(51) Int. Cl.[7] .................................................. B64C 21/04
(52) U.S. Cl. .................... 244/207; 244/53 R; 244/53 B; 60/231
(58) Field of Search ................... 244/207, 53 R, 244/130, 53 B; 60/231, 226.3

(56) References Cited

U.S. PATENT DOCUMENTS

| | | | |
|---|---|---|---|
| 3,216,455 | * | 11/1965 | Cornell et al. . |
| 3,933,327 | * | 1/1976 | Cook et al. . |
| 3,981,466 | * | 9/1976 | Shah . |
| 4,674,714 | * | 6/1987 | Cole et al. . |
| 4,738,416 | * | 4/1988 | Birbragher . |
| 4,993,663 | * | 2/1991 | Lahti et al. . |
| 5,447,283 | * | 9/1995 | Tindell . |
| 5,485,975 | * | 1/1996 | Tindell . |

* cited by examiner

*Primary Examiner*—Peter M. Poon
*Assistant Examiner*—Tien Dinh
(74) *Attorney, Agent, or Firm*—Terry J. Anderson; Karl J. Hoch, Jr.

(57) ABSTRACT

In accordance with the present invention, an aerodynamic turbo engine nacelle, disposable about an engine having an engine face, for mitigating boundary layer separation of intake airflow comprises an engine inlet. The engine inlet is provided with an interior surface and a curved portion. The curved portion having a leading edge. The geometry of the engine inlet is such that the ratio of the circular area defined by the diameter defined by the leading edge of the curved portion to the minimum circular area defined by the interior surface of the engine inlet is less than 1.33. The engine nacelle is further provided with a pressurized fluid injecting device for injecting pressurized fluid at the engine inlet in a direction generally parallel to intake airflow in response to sensed airflow conditions.

12 Claims, 1 Drawing Sheet

THIN INLET LIP DESIGN FOR LOW DRAG AND REDUCED NACELLE SIZE

FIELD OF THE INVENTION

The present invention relates generally to an air vehicle engine nacelle, and more particularly to an aerodynamic engine nacelle designed to eliminate intake airflow boundary layer separation.

BACKGROUND OF THE INVENTION

When a turbo engine air vehicle is at a relatively low speed and a significant engine power increase is required, the problem of intake airflow boundary layer separation at the engine inlet is presented.

Take for example, an aircraft performing take-off operations. The aircraft is initially stationary on the tarmac. The pilot, desiring maximum engine power output, throttles-up the engines. The velocity of the intake airflow prior to entering the engine inlet is relatively low in comparison to the airflow at the engine face within the engine housing or engine nacelle. The engine may be described as rapidly sucking in airflow in order to meet the high power output requirement. Under these conditions (relative low aircraft speed and high engine output requirements), unless adequately compensated for in the design of the engine inlet, boundary layer separation of the intake airflow at the engine inlet will likely occur. Another circumstance of when this may occur is where an aircraft is loitering at a relative low speed (for example, waiting its turn to land at an airport) and a sudden high power output is required (possibly, in order to perform an evasive maneuver).

Boundary layer separation of the intake airflow at the engine inlet results in a significant negative impact on the net power output of the engine. This is because the intake airflow is initially laminar with the airflow being efficiently sucked into and through the engine. Once boundary layer separation occurs, however, the airflow become vortical, having significant localized pressure and direction variations, resulting in a significant loss of engine face pressure. Engine face pressure directly impacts the engine power output performance. In the context of commercial airliners, for example, a loss of 1% of engine face pressure can result in a 1.2–1.5% loss of engine thrust. Moreover, in a worst case scenario, the vortical flow may result in an engine stall.

Previous efforts to address this engine inlet boundary layer separation problem focused at altering the surface contours of the inlet lip. It is known in the art that by smoothing or rounding the leading edge curvature of the inlet lip the boundary separation phenomenon can be altered. This smoothing or rounding of the inlet lip results in a "thick lip" inlet design.

Within the boundary layer, frictional inlet surface forces act to decrease the momentum of the airflow. Boundary layer separation of the airflow results when the momentum of the localized airflow is insufficient to overcome these frictional forces. The effect of rounding the inlet lip is to locally increase the momentum of the airflow within the boundary layer. Thus, the localized airflow is energized as it is swept around the curved thick inlet lip, thereby avoiding boundary layer separation.

The relative thickness of the inlet lip can be described in terms of the ratio of the circular area defined by the diameter defined by the leading edge of a engine inlet to the minimum circular area defined by the interior surface of the engine inlet (lip contraction ratio). In the context of commercial airliners, the industry standard for this lip contraction ratio is 1.33. "Thick" lip designs, however, increase the maximum diameter requirements of the engine nacelle or engine housing, thereby incurring weight, volume, and high speed aerodynamic/drag penalties.

Other previous efforts have employed variable inlet geometry designs. For example, these designs have employed translating engine cowls, where an aerodynamic thin lip inlet has a forward portion which slides forward (on tracks, for example) revealing a localized smooth or rounded inlet lip. Likewise, inlet designs have employed auxiliary inlets or ports, where a thin lip inlet has flaps or doors which reveals a localized smooth or rounded inlet lip. While these designs may address the boundary layer separation problem, they incur significant penalties in relation to weight, volume, airflow leakage, manufacturing costs and maintenance costs.

Accordingly, there is a need in the art for a turbo engine inlet design which addresses inlet boundary layer separation problem without attendant penalties in relation to aerodynamics, weight, volume, and cost.

SUMMARY OF THE INVENTION

In accordance with the present invention, an aerodynamic turbo engine nacelle, disposable about an engine having an engine face, for mitigating boundary layer separation of intake airflow comprises an engine inlet. The engine inlet is provided with an interior surface and a curved portion. The curved portion having a leading edge. The geometry of the engine inlet is such that the ratio of the circular area defined by the diameter defined by the leading edge of the curved portion to the minimum circular area defined by the interior surface of the engine inlet is less than 1.33. The engine nacelle is further provided with a pressurized fluid injecting device for injecting pressurized fluid at the engine inlet in a direction generally parallel to intake airflow in response to sensed airflow conditions. The sensed airflow conditions may comprise boundary layer separation at the engine inlet or airflow pressure at the engine face.

In addition, the present invention contemplates injecting the pressurized fluid at a pressure and velocity which are a function of the loss of momentum of the airflow due to friction at the interior surface of the engine inlet, the change in velocity and pressure of the airflow due to the curved portion of the engine inlet, the pressure and velocity of the intake airflow, and the pressure and velocity of the airflow at the engine face.

It is preferred that the pressurized fluid is injected at an airflow rate of greater than zero and less than 5% of the engine airflow rate. The injected pressurized fluid may be taken from the airflow downstream of the engine inlet. For example, the pressurized fluid may be bled from the turbo compressor of the engine. As a result, because the present invention contemplates using a relatively small amount of injected airflow, less than 5% of the engine airflow rate, the penalty on the engine output performance is minimal. Further, where the present invention is disposable in a nacelle having an anti-icing airflow, the injected pressurized fluid may be taken from the anti-icing airflow. This is especially advantageous, because where anti-icing airflow is bled from the engine the penalty in engine output performance due to the bled airflow has already been incurred. Additionally, the fluid injecting device may be located upstream or downstream of the point of where boundary layer separation occurs without injecting the pressurized fluid. The fluid injecting device may be provided with at least one jet. Furthermore, the above described invention may be disposed in a turbo engine air vehicle.

In another embodiment of the present invention, there is provided a method for mitigating intake airflow boundary layer separation in a turbo engine nacelle having an engine inlet having an interior surface and a curved portion having a leading edge, and a ratio of the circular area defined by the diameter defined by the leading edge of a engine inlet to the minimum circular area defined by the interior surface of the engine inlet less than 1.33. The method begins with an initial step of injecting a pressurized fluid at the engine inlet in a direction generally parallel to intake airflow. The method further provides for controlling the pressure and velocity of the injected pressurized fluid in response to sensed airflow conditions. The sensed airflow conditions may comprise boundary layer separation at the engine inlet or airflow pressure at the engine face. The pressurized fluid may be injected at a pressure and velocity which are a function of the loss of momentum of the airflow due to friction at the interior surface of the engine inlet, the change in velocity and pressure of the airflow due to the curved portion of the engine inlet, the pressure and velocity of the intake airflow, and the pressure and velocity of the airflow at the engine face. Further, the method of the present invention includes injecting the pressurized fluid at an airflow rate of greater than zero and less than 5% of the engine airflow rate.

Further, in accordance with the present invention, there is provided a method of reducing the ratio of the circular area defined by the diameter defined by the leading edge of a engine inlet to the minimum circular area defined by the interior surface of the engine inlet, while substantially maintaining the ratio of the pressure of intake airflow to the pressure of the airflow at the engine face necessary to mitigate engine inlet boundary layer separation, in an air vehicle having a turbo engine nacelle having an engine inlet having a leading edge and an interior surface, and an engine having an engine face. In this embodiment of the present invention, an initial step of injecting a pressurized fluid at the engine inlet in a direction generally parallel to intake airflow is followed. Next, the diameter defined by the leading edge of the engine inlet is reduced, such that the ratio of the pressure of the intake airflow to the pressure of airflow at the engine face is substantially equal to that ratio prior to injecting the pressurized fluid. Finally, the pressure and velocity of the injected pressurized fluid is controlled in response to sensed airflow conditions.

As is apparent from the foregoing description of the aerodynamic turbo engine nacelle constructed in accordance with the present invention, such nacelle seeks to mitigate boundary layer separation of the airflow at the engine inlet. The present invention especially has application where an aircraft is at relatively low speed and there is a high engine output requirement, since boundary layer separation of the intake airflow at the engine inlet will likely occur. In this respect, the present nacelle is equipped with a fluid injecting device at the engine inlet. The injected fluid is intended to provide the airflow with sufficient momentum so as to prevent boundary layer separation from occurring or so as to cause boundary layer re-attachment once boundary layer separation has occurred.

The present invention addresses the various problems associated with previous efforts to mitigate intake airflow boundary layer separation because the injected fluid provides the desired increase in airflow momentum, in order to mitigate boundary layer separation, rather than altering the inlet lip thickness. Correspondingly, the maximum diameter requirements of the engine nacelle or engine housing need not be increased, thereby avoiding weight, volume, and high speed aerodynamic/drag penalties. In addition, the present invention does not employ any variable inlet devices with associated weight, volume, airflow leakage, manufacturing cost and maintenance cost penalties.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
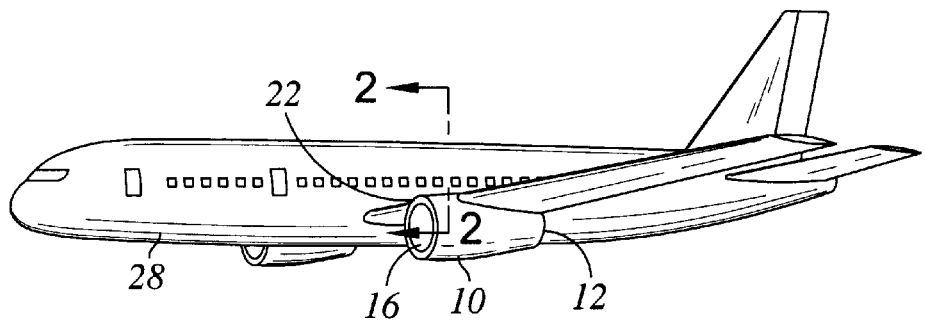
FIG. 1 is a perspective view of the present invention.
Figure 2:
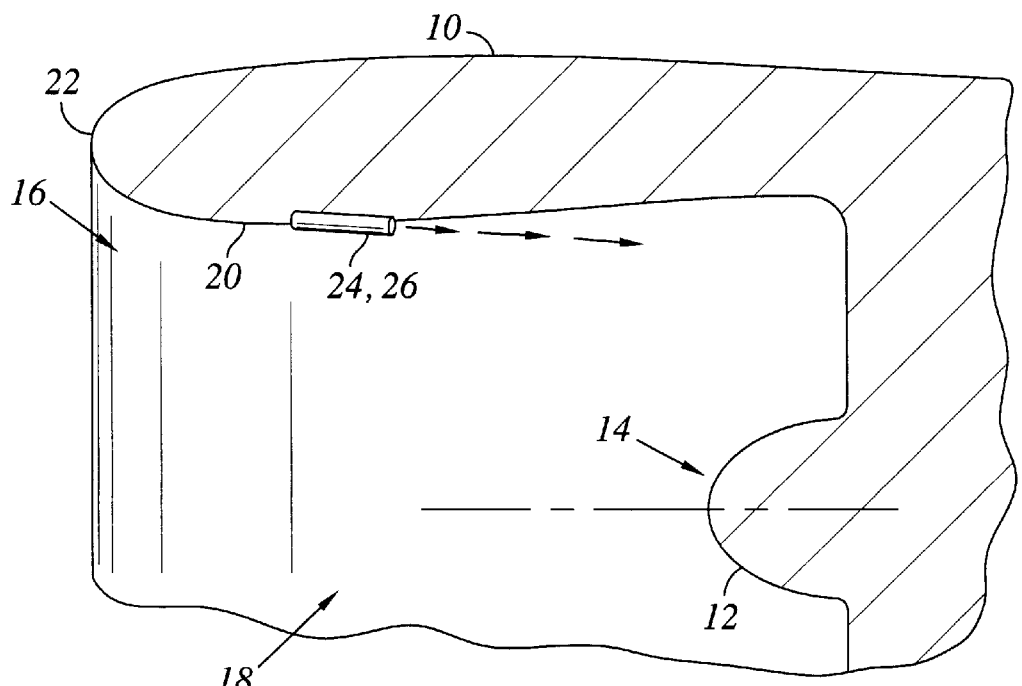
FIG. 2 is a partial cross-sectional view of an engine nacelle.

Referring now to the drawings wherein the showings are for purposes of illustrating a preferred embodiment of the present invention only, and not for purposes of limiting the same, FIGS. 1 and 2 illustrate an aerodynamic turbo engine nacelle 10 which is constructed in accordance with the present invention. As will be described in more detail below, the aerodynamic turbo engine nacelle 10 is designed to mitigate intake airflow boundary layer separation.

In accordance with the present invention, an aerodynamic turbo engine nacelle 10, disposable about an engine 12 having an engine face 14, for mitigating boundary layer separation of intake airflow comprises an engine inlet 16. The engine inlet 16 is provided with an interior surface 18 and a curved portion 20. The curved portion 20 has a leading edge 22. The geometry of the engine inlet 16 is constructed such that the ratio of the circular area defined by the diameter defined by the leading edge 22 of the curved portion 20 to the minimum circular area defined by the interior surface 18 of the engine inlet 16 is less than 1.33. The engine nacelle 10 further comprising a pressurized fluid injecting device 24 for injecting pressurized fluid at the engine inlet 16 in a direction generally parallel to intake airflow in response to sensed airflow conditions. The sensed airflow conditions may comprise boundary layer separation at the engine inlet 16 or airflow pressure at the engine face 14.

In addition, the present invention contemplates injecting the pressurized fluid at a pressure and velocity which are a function of the loss of momentum of the airflow due to friction at the interior surface 18 of the engine inlet 16, the change in velocity and pressure of the airflow due to the curved portion 20 of the engine inlet 16, the pressure and velocity of the intake airflow, and the pressure and velocity of the airflow at the engine face 14. The nature of this functional relationship may be theoretically derived from Navier-Stokes equations, empirical data, and other methods known by those skilled in the art. It is further contemplated that the pressure and velocity of the injected fluid is a function of fluidic density of the injected fluid and of the intake airflow. It is preferred that air would be the pressurized injected fluid, however, other fluids are contemplated which are well known to those skilled in the art. It is contemplated that reduction of diameter defined by the leading edge 22 of the curved portion 20 of the engine inlet 16 allows for the reduction of the size of the engine nacelle 10. Correspondingly, it is recognized that the aerodynamic drag on the engine nacelle 10 is likewise reduced. It is contemplated that a functional relationship exists between the aerodynamic drag on the engine nacelle 10 and those pressure, velocity and geometric variables discussed above.

The nature of this functional relationship may be theoretically derived from Navier-Stokes equations, empirical data, and other methods known by those skilled in the art.

In the preferred embodiment, the pressurized fluid is injected at an airflow rate of greater than zero and less than 5% of the engine airflow rate. The injected pressurized fluid may be taken from the airflow downstream of the engine inlet. For example, the pressurized fluid may be bled from a engine turbo compressor. As a result, because the present invention contemplates using a relatively small amount of injected airflow, less than 5% of the engine airflow rate, the penalty on the engine output performance is minimal. It is contemplated that the penalty on the engine output performance could be compensated for by overspeeding the engine, for example, and other methods well known to those skilled in the art.

It is preferred that where the present invention is disposable in a nacelle having an anti-icing airflow (not depicted) which has been already bled from the engine, the injected pressurized fluid may be taken from this anti-icing airflow. This is especially advantageous, because the penalty in engine output performance due to the bled airflow has already been incurred. Other sources of the pressurized fluid are contemplated, such as tanks, dedicated compressors and those well known to those skilled in the art.

Additionally, the fluid injecting device 24 may be located upstream or downstream of the point of where boundary layer separation occurs without injecting the pressurized fluid. The fluid injecting device 24 may comprise of at least one jet 26. Those skilled in the art will recognize that a plurality of jet may be utilized and arranged in a variety of configurations. Furthermore, the above described invention may be disposed in a turbo engine air vehicle 28.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aerodynamic turbo engine nacelle, disposable about an engine having an engine face, for mitigating boundary layer separation of intake airflow comprising:

an engine inlet having an interior surface and a curved portion having a leading edge, the leading edge defining an interior surface circular area, the interior surface defining a minimum circular area, the engine inlet having a ratio of the interior surface circular area to the minimum circular area less than 1.33; and a pressurized fluid injecting device for injecting pressurized fluid at the engine inlet for mitigating against boundary layer separation at the engine inlet, the pressurized fluid injecting device being aligned to inject pressurized fluid in an direction and at a pressure and velocity to simulate a ratio of the interior surface circular area to the minimum circular area which is greater than 1.33.

2. The aerodynamic turbo engine nacelle of claim 1 wherein the pressurized fluid being injected at a velocity which is a function of the loss of momentum of the airflow due to friction at the interior surface of the engine inlet, the change in velocity and pressure of the airflow due to the curved portion of the engine inlet, the pressure and velocity of the intake airflow, and the pressure and velocity of the airflow at the engine face.

3. The aerodynamic turbo engine nacelle of claim 1 wherein the pressurized fluid being injected at a pressure which is a function of the loss of momentum of the airflow due to friction at the interior surface of the engine inlet, the change in velocity and pressure of the airflow due to the curved portion of the engine inlet, the pressure and velocity of the intake airflow, and the pressure and velocity of the airflow at the engine face.

4. The aerodynamic turbo engine nacelle of claim 1 wherein the pressurized fluid being injected at an airflow rate of greater than zero and less than 5% of the engine airflow rate.

5. The aerodynamic turbo engine nacelle of claim 1 wherein said injected pressurized fluid is taken from the intake airflow downstream of the engine inlet.

6. The aerodynamic turbo engine nacelle of claim 1 wherein anti-icing airflow is disposable in the engine nacelle and the injected pressurized fluid is taken from the anti-icing airflow.

7. The aerodynamic turbo engine nacelle of claim 1 wherein the fluid injecting device being located upstream of the point of where boundary layer separation occurs without injecting the pressurized fluid.

8. The aerodynamic turbo engine nacelle of claim 1 wherein the fluid injecting device being located downstream of the point of where boundary layer separation occurs without injecting the pressurized fluid.

9. The aerodynamic turbo engine nacelle of claim 1 wherein the fluid injecting device comprising at least one jet.

10. In a turbo engine nacelle having an engine inlet having an interior surface and a curved portion having a leading edge, the leading edge defining an interior surface circular area, the interior surface defining a minimum circular area, the engine inlet having a ratio of the circular area to the minimum circular area less than 1.33, a method for mitigating intake airflow boundary layer separation comprising the following steps:

(a) injecting a pressurized fluid at the engine inlet in a direction and at a pressure and velocity to simulate a ratio of the interior surface circular area to the minimum circular area which is greater than 1.33; and (b) controlling the pressure and velocity of the injected pressurized fluid in response to sensed airflow conditions.

11. The method of claim 10 wherein step (a) the pressurized fluid being injected at a pressure and velocity which are a function of the loss of momentum of the airflow due to friction at the interior surface of the engine inlet, the change in velocity and pressure of the airflow due to the curved portion of the engine inlet, the pressure and velocity of the intake airflow, and the pressure and velocity of the airflow at the engine face.

12. The method of claim 10 where in step (a) the pressurized fluid being injected at an airflow rate of greater than zero and less than 5% of the engine airflow rate.

* * * * *